United States Patent [19]

Sawada et al.

[11] 3,882,878

[45] May 13, 1975

[54] METHOD FOR PREPARING CIGARETTE FILTER OF CELLULOSE ACETATE FIBERS

[75] Inventors: Hideo Sawada; Junji Kawamoto, both of Sakai, Japan

[73] Assignee: Daicel Ltd., Osaka, Japan

[22] Filed: Aug. 22, 1973

[21] Appl. No.: 389,084

[52] U.S. Cl. ............... 131/267; 156/180; 156/307
[51] Int. Cl. .................................... A24b 15/02
[58] Field of Search ............ 156/180, 307; 131/267; 260/448 J; 131/10 R, 10.9

[56] References Cited
UNITED STATES PATENTS

| | | | |
|---|---|---|---|
| 3,008,474 | 11/1961 | Touey et al. | 131/208 |
| 3,017,309 | 1/1962 | Crawford et al. | 156/161 |
| 3,043,736 | 7/1962 | Touey | 156/152 |
| 3,451,887 | 6/1969 | Touey et al. | 161/168 |

*Primary Examiner*—Daniel J. Fritsch
*Attorney, Agent, or Firm*—Woodhams, Blanchard and Flynn

[57] ABSTRACT

A method for preparing a cigarette filter of cullulose acetate fibers is provided, which is characterized by blooming a tow composed of cellulose acetate fibers, adding to the bloomed tow 1 to 20% by weight (based on the cellulose acetate fibers) of a plasticizer comprising as an ingredient at least one member selected from diacetate, dipropionate and dibutyrate esters of 1,3-butylene glycol, and gathering the thus treated bloomed tow.

10 Claims, No Drawings

METHOD FOR PREPARING CIGARETTE FILTER OF CELLULOSE ACETATE FIBERS

This invention relates to a method for preparing a cigarette filter. More particularly, the invention relates to a method for preparing a cigarette filter which comprises adding a plasticizer containing as an ingredient a diacetate, dipropionate or dibutyrate ester of 1,3-butylene glycol to cellulose acetate fibers.

A plasticizer for a cigarette filter of cellulose acetate fibers dissolves partially cellulose acetate fibers where it contacts the fibers and bonds the dissolved fibers to one another at random points of contact to retain the spaces of a filter made from the fibers and to impart a suitable hardness to the fibers in the filter shape. Thus, the plasticizer is indispensable as a component for imparting to the filter a hardness necessary during the subsequent step of cutting the fibers of the filter shape into rods.

In general, triacetin, diacetate, dipropionate and dibutyrate esters of polyethylene glycol, dimethoxyethyl phthalate and triethyl citrate are used as plasticizers for cellulose acetate fibers constituting cigarette filters.

In case triethyl citrate and dimethoxyethyl phthalate are used among such plasticizers, it is necessary to heat filter rods at high temperatures exceeding room temperature for 2 to 4 hours during the step of curing the rods. Although triacetin is known as a plasticizer for causing the curing at room temperature, it takes more than 24 hours to complete the curing. A diacetate, dipropionate or dibutyrate of triethylene glycol is a plasticizer imparting a sufficient hardness at room temperature within a relatively short time, but it is still insufficient with respect to the cigarette flavor.

When a plasticizer containing as an ingredient a diester compound of 1,3-butylene glycol is employed according to this invention, a sufficient hardness can be imparted to rods at room temperature within a short time. The curing rate attained by the plasticizer of this invention is higher than the curing rate of triethylene glycol diacetate which is said to give a highest curing rate among conventional plasticizers. Furthermore, the plasticizer of this invention is odorless and non-toxic and does not damage the flavor of cigarettes. We found the foregoing facts and have now completed this invention based on these findings.

It is therefore a primary object of this invention to provide a method for preparing cigarette filters of cellulose acetate fibers in which a plasticizer having a very high curing rate is employed.

Diester compounds of 1,3-butylene glycol to be used in this invention are compounds represented by the following general formula:

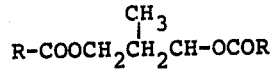

wherein R stands for a methyl, ethyl or butyl group, and these compounds can be used singly or in combination with other plasticizers. Since these diesters of 1,3-butylene glycol have a very high plasticizing effect, sufficient results can be obtained even when they are used in smaller amounts than the amounts usually employed in the case of triacetin and triethylene glycol diacetate. Namely, in this invention, it is preferred that the plasticizer is added in an amount of 1 to 20% by weight (all percent values given hereinafter are on the weight basis), especially 3 to 10%, based on the cellulose acetate fibers.

In this invention, cellulose acetate fibers are used in the form of a tow obtained by gathering 5,000 to 100,000 continuous fibers having a size of 1 to 16 deniers. It is preferred that 10 to 30 uniform crimps are given to the tow per 25 mm of the tow length.

Any method that can apply the plasticizer uniformly to cellulose acetate fibers may be adopted in this invention without any particular limitation. For instance, the plasticizer is applied to both the upper and lower surfaces of the tow by a known method using a spray gun or wick. In case the amount of the plasticizer is too large, cellulose acetate fibers are so dissolved that dopes are formed. Accordingly, it is desired that the plasticizer is applied uniformly. In case the amount of the plasticizer is too small, a sufficient bonding is not obtained among the fibers. In view of the foregoing, in this invention it is important that the plasticizer is distributed uniformly in the interior of the tow band.

In this invention, the preparation of cigarette filters from plasticizer-incorporated tows can be conducted by methods now industrially conducted for the preparation of cigarette filters of cellulose acetate fibers.

The cigarette filter obtained by the above-mentioned method of this invention is characterized in that inherent properties of cellulose acetate fibers are not lost and a very high curing rate can be retained. Accordingly, this invention has a great industrial value.

The method of this invention will now be illustrated by reference to Examples. In the Examples, the rod hardness was determined by the following method. Namely, a load of 300 g was imposed on a horizontally placed sample rod through a disc having a diameter of 12 mm for 10 seconds. The depth of the indentation formed by the load was read by considering 0.1 millimeter to be one unit, down to one decimal place of the unit. A lower value indicates that the sample is hard, and a higher value indicates that the sample is soft.

The pressure drop is expressed in terms of the resistance pressure in a water column height (mm) obtained when air was passed through a filter rod of a length of 102 mm at a rate of 17.5 ml/sec.

EXAMPLES 1 TO 7

A cellulose acetate fiber tow of a filament denier of 4 and a total denier of 43,000 having 26 crimps per 25 mm of the tow length was bloomed and a diacetate of 1,3-butylene glycol diacetate or a mixture of equal amounts of said diacetate and another plasticizer was added in a prescribed amount to the bloomed cellulose acetate fiber tow by means of a plasticizer-applicator. Then, the tow is fed to a filter rod maker and wrapped by means of a rice paper. Then, it was cut into a length of 102 mm.

Such filter characteristics as the rod weight, the pressure drop and the hardness of the rod which had been allowed to stand still at 20°C for 1 or 24 hours after preparation of the rods were determined with respect to the resulting rod. The results are shown in Table 1.

The above procedures were repeated in the same manner by employing triacetin, triethylene glycol diacetate, triethylene glycol dipropionate and tetraethylene glycol dipropionate as the plasticizer. With respect to the thus prepared rods and a rod prepared in the same manner as above without use of any plasticizer, the hardness was determined after the rods had been plasticizer, to stand still at 20°C for 1 or 24 hours. The results are shown in Table 1 as Comparative Examples.

From the results shown in Table 1, it will readily be understood that the time necessary for a rod to have a sufficient hardness (less than 10) is 24 hours in the case of triacetin or triethylene glycol diacetate, but in the case of 1,3-butylene glycol diacetate 1 hour gives a sufficient hardness. It is also seen that a sufficient effect can be obtained with use of a smaller amount of the plasticizer in the case of 1,3-butylene glycol diacetate.

Each of the thus obtained rods having a length of 102 mm was divided into 6 filter tips having a length of 17 mm. A tip of a commercially availabale Hi-Light cigarette (Trade Mark) was removed and the thus formed tip was attached instead. As a result of the smoking test, it was found that a particularly good taste and flavour was obtained in the case of the plasticizer comprising 1,3-butylene glycol diacetate.

4. A method according to claim 3, in which the tow has 10 to 30 uniform crimps per 25 mm of the tow length.

5. A method according to claim 1, wherein said plasticizer consists essentially of said ingredient.

6. A method according to claim 1, wherein said plasticizer contains at least 50% by weight of said ingredient.

7. A method according to claim 6, wherein the remainder of said plasticizer is a substance selected from the group consisting of triacetin and the diacetate, dipropionate and dibutyrate esters of polyethylene glycol.

8. A method according to claim 1, in which the filter is cured at room temperature and the amount of said ingredient applied to the fibers is effective to impart to the filter a hardness of less than 10 units after curing at room temperature for one hour, wherein hardness is measured by imposing a load of 300 g onto the filter by means of a disc having a diameter of 12 mm for 10 sec- Table 1

| Example No. | Plasticizer kind | % by weight | Rod Weight (g/rod) | Pressure Drop (mm $H_2O$) | Hardness after one hour | Hardness after 24 hours |
|---|---|---|---|---|---|---|
| Example 1 | 1,3-butylene glycol diacetate | 4.5 | 0.735 | 272 | 9.7 | 9.5 |
| Example 2 | do. | 6.5 | 0.725 | 268 | 8.9 | 8.3 |
| Example 3 | do. | 7.2 | 0.724 | 265 | 8.9 | 8.1 |
| Example 4 | do. | 9.9 | 0.749 | 259 | 8.8 | 7.8 |
| Example 5 | do. | 13.8 | 0.733 | 258 | 8.3 | 7.2 |
| Example 6 | equal amount mixture of 1,3-butylene diacetate and triacetin | 7.1 | 0.751 | 261 | 8.2 | 7.8 |
| Example 7 | equal amount mixture of 1,3-butylene acetate and triethylene glycol diacetate | 8.3 | 0.748 | 259 | 8.0 | 7.6 |
| Comparative Example 1 | not added | 0 | 0.677 | 247 | 12.1 | 12.7 |
| Comparative Example 2 | triacetin | 8.0 | 0.735 | 259 | 10.5 | 8.3 |
| Comparative Example 3 | triethylene glycol diacetate | 6.3 | 0.743 | 253 | 10 | 9.8 |
| Comparative Example 4 | triethylene glycol dipropionate | 9.0 | 0.738 | 258 | 10 | 8.5 |
| Comparative Example 5 | tetraethylene glycol dipropionate | 9.5 | 0.740 | 260 | 10 | 7.3 |

What we claim is:

1. A method for preparing a cigarette filter of cellulose acetate fibers which comprises blooming a tow composed of cellulose acetate fibers, distributing uniformly throughout the bloomed tow from 1 to 20% by weight, based on the cellulose acetate fibers, of a plasticizer comprising as an ingredient at least one member selected from the group consisting of the diacetate, dipropionate and dibutyrate esters of 1,3-butylene glycol, and gathering the thus-treated bloomed tow to form a filter.

2. A method according to claim 1, in which the plasticizer is added in an amount of 3 to 10% by weight based on the cellulose acetate fibers.

3. A method according to claim 1, in which the cellulose acetate fiber tow is obtained by gathering 5,000 to 100,000 continuous fibers having a size of 1 to 16 deniers.

onds and measuring the depth of the indentation thereby formed in the filter and wherein one hardness unit is equal to 0.1 millimeter of the depth of the indentation.

9. A tobacco smoke filter comprising a bundle of substantially longitudinally extending cellulose acetate fibers having a size of from 1 to 16 denier per fiber, said fibers being substantially uniformly coated with from 1 to 20% by weight, based on the weight of the fibers, of a plasticizer of at least one member selected from the group consisting of the diacetate, dipropionate and dibutyrate esters of 1,3-butylene glycol.

10. A tobacco smoke filter according to claim 9, in which the amount of plasticizer is from 3 to 10% by weight, based on the weight of the cellulose acetate fibers.

* * * * *